June 20, 1933.  A. R. McCANN  1,914,643
VEHICLE PARKING DEVICE
Filed June 22, 1932   4 Sheets-Sheet 1
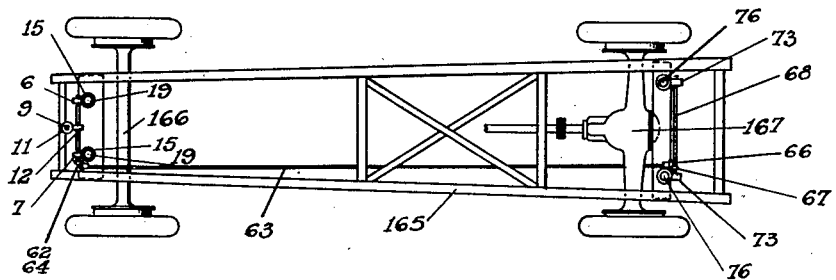
Fig.1.
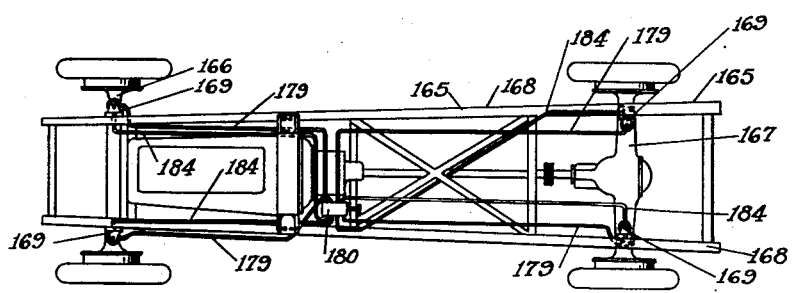
Fig.2.
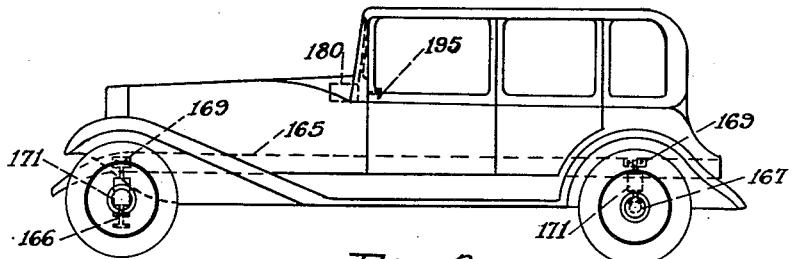
Fig.3.
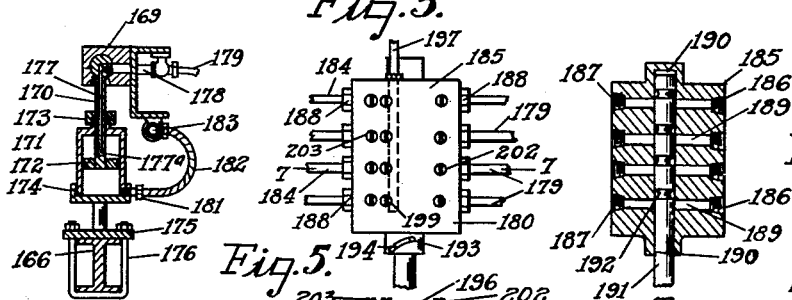
Fig.4.  Fig.5.  Fig.6.
Fig.7.
INVENTOR,
Alfred R. McCann
By Howard P. Smith
His ATTORNEY June 20, 1933.  A. R. McCANN  1,914,643
VEHICLE PARKING DEVICE
Filed June 22, 1932  4 Sheets-Sheet 2
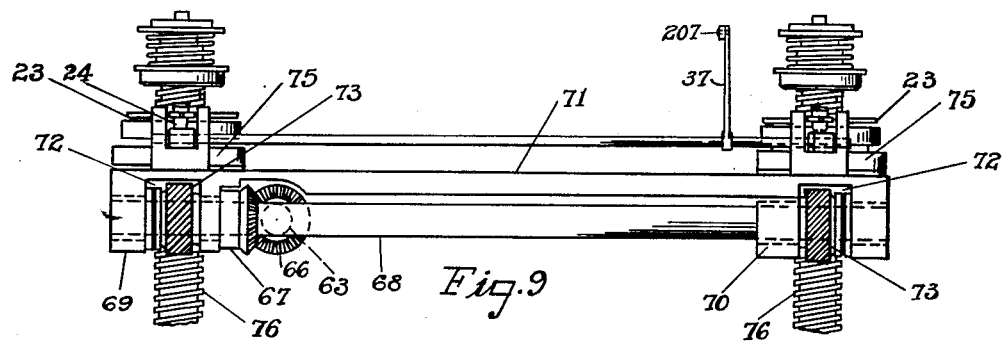
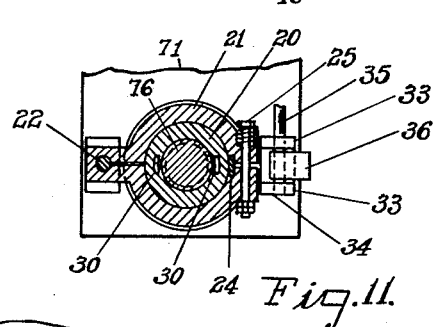
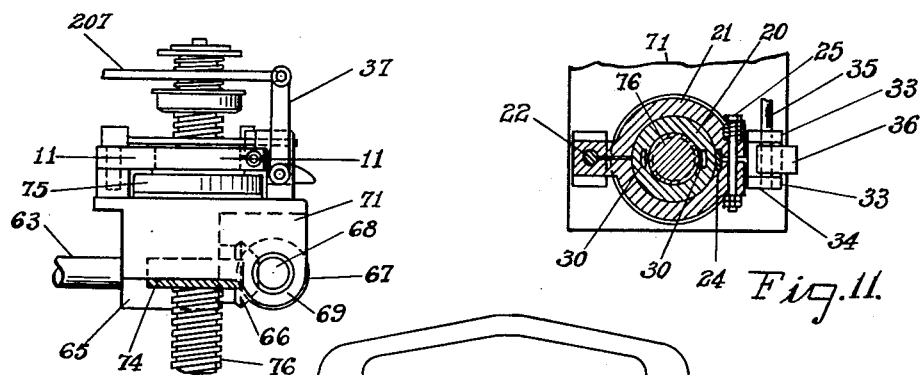
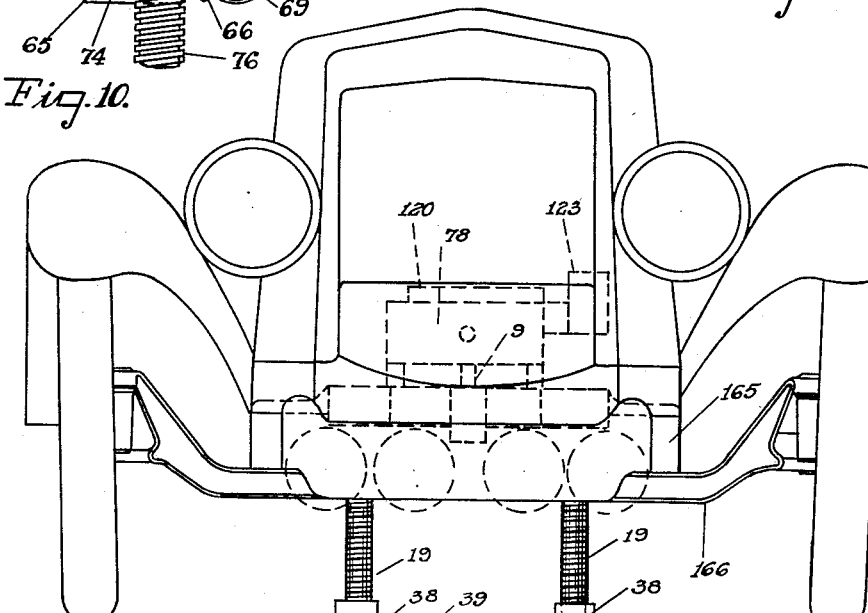

June 20, 1933.  A. R. McCANN  1,914,643
VEHICLE PARKING DEVICE
Filed June 22, 1932  4 Sheets-Sheet 3

INVENTOR,
Alfred R. McCann,
BY Howard S. Smith,
His ATTORNEY

June 20, 1933.  A. R. McCANN  1,914,643
VEHICLE PARKING DEVICE
Filed June 22, 1932   4 Sheets-Sheet 4
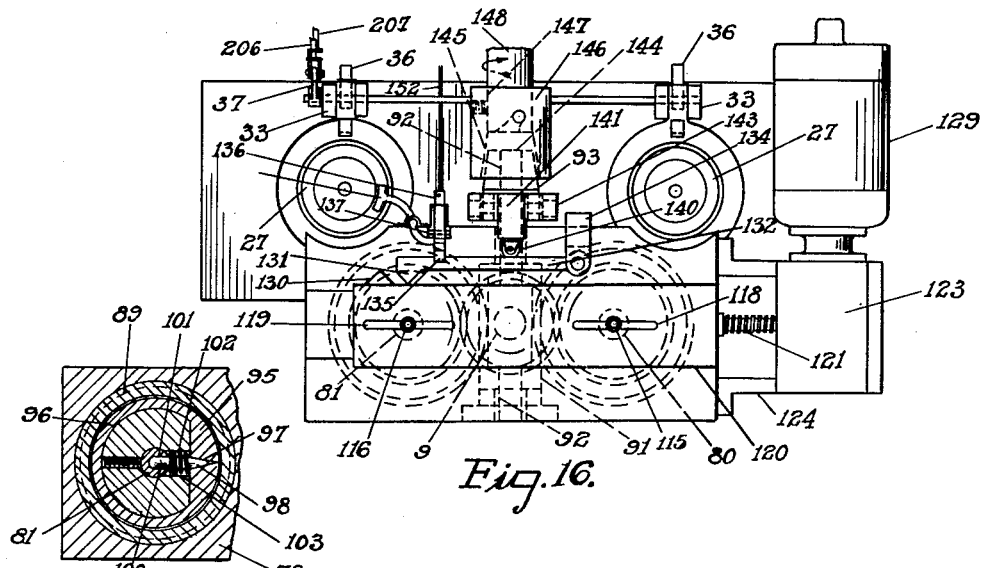
Fig.16.
Fig.19.
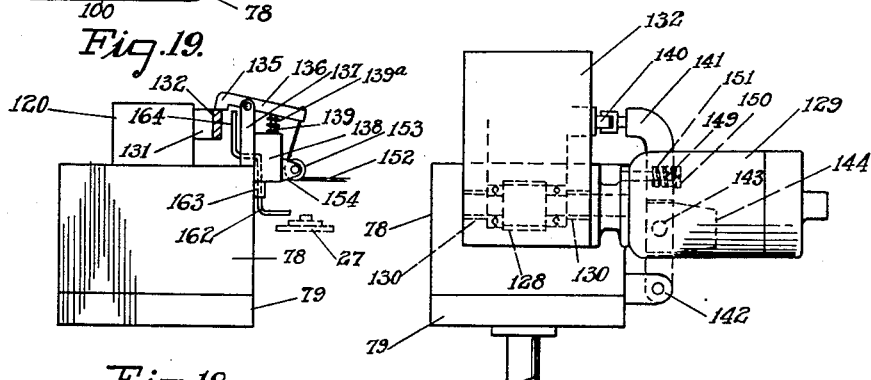
Fig.18.
Fig.17.
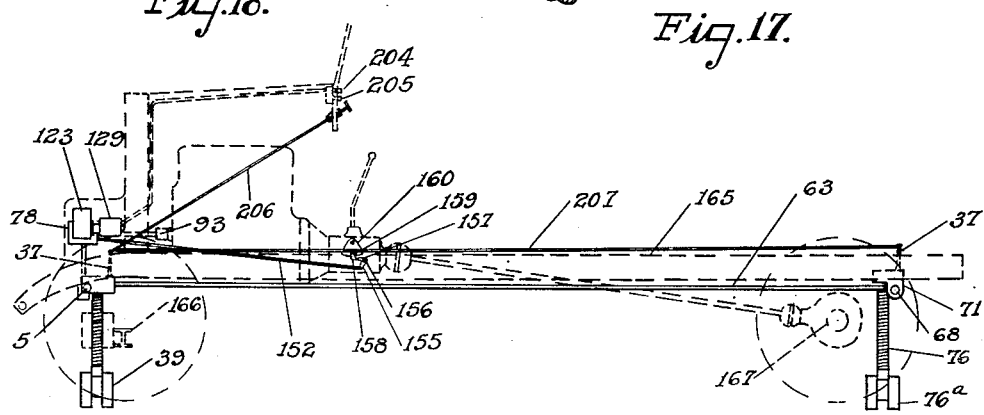
Fig.20.
INVENTOR
Alfred R. McCann,
Howard S. Smith,
BY
His ATTORNEY Patented June 20, 1933

1,914,643

UNITED STATES PATENT OFFICE

ALFRED R. McCANN, OF HAMILTON, OHIO

VEHICLE PARKING DEVICE

Application filed June 22, 1932. Serial No. 618,615.

This invention relates to new and useful improvements in vehicle parking devices.

It is one of the principal objects of the invention to provide a compact, substantial and efficient retractable mechanism which, when in its lowered position, will elevate the vehicle until its wheels clear the ground and then move it transversely as desired.

It is another object of the invention to provide a simple and efficient instrument board control for the operation of my vehicle parking device, without the necessity of providing auxiliary levers in the driver's compartment for this purpose.

Another object of the invention is to provide a retractable parking device which, in its retracted position, is practically concealed by the body and front apron of the car.

It is another object of the invention to provide in an automobile parking device, elevator and traction means that are unaffected by gravity or a sloping road such as is often encountered near its shoulders or a curb.

Another object of the invention is the provision of a parking device which may be included either as an accessory or as standard equipment in an automobile.

It is another object of the invention to provide automatic means for locking the transmission in a neutral position when the parking device is raising the car, and to unlock the transmission when the vehicle is lowered.

Another object of my invention is the provision of a fluid shock absorber having a dash control, whereby the car springs may be held in a fixed position relative to the frame to lessen the required vertical travel of the latter when the car wheels are raised from the ground.

Other important and incidental objects will be brought out in the following specification and particularly set forth in the subjoined claims.

Figures 13, 14:
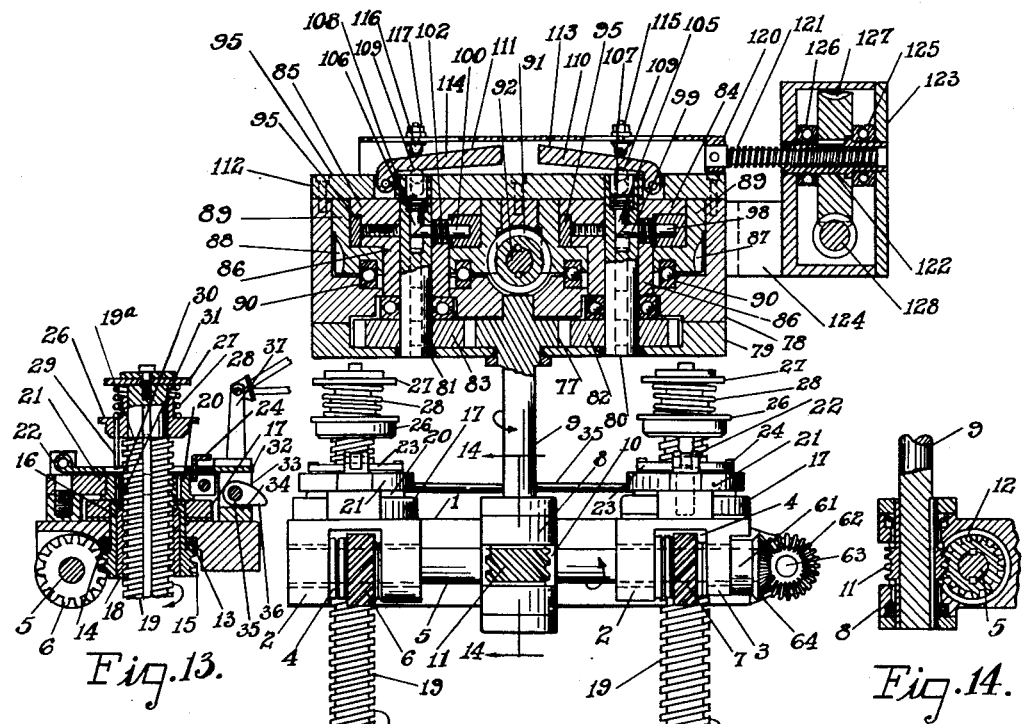
Figures 12, 15:
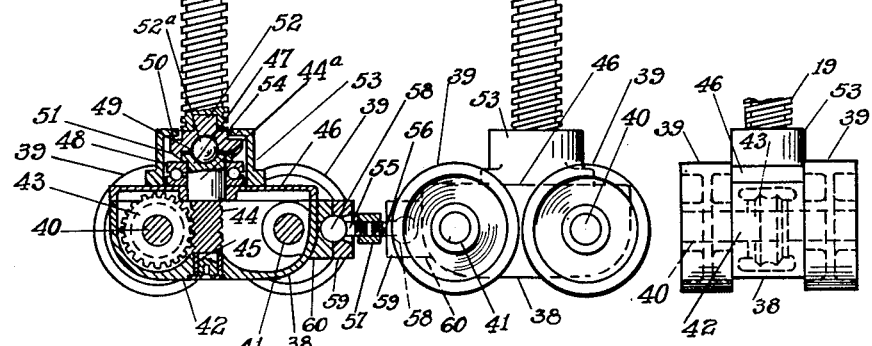

In the accompanying drawings illustrating one form of embodiment of my invention, Figure 1 is a plan view of the chassis of an automobile, showing the location of the front and rear elevating mechanisms. Figure 2 is also a plan view of the chassis of an automobile, showing the shock absorbers and control lines. Figure 3 is a side view of an automobile, showing the position of my shock absorber thereon. Figure 4 is a detail view, in section, showing one of the shock absorbers. Figure 5 is a plan view of the shock absorber control. Figure 6 is a longitudinal, sectional view taken therethrough, showing the valve and ports. Figure 7 is a transverse sectional view taken on the line 7—7 of Figure 5. Figure 8 is a front view of an automobile, showing it in an elevated position. Figure 9 is a rear view of the rear elevating mechanism. Figure 10 is a side view of one of the clutch and drive heads of the rear elevating mechanism. Figure 11 is a cross sectional view taken on the line 11—11 of Figure 10. Figure 12 is a front elevational view of the front elevating mechanism and the reversible drive mechanism, showing the latter in section. Figure 13 is a vertical section taken through one of the clutch and drive heads. Figure 14 is a sectional view taken on the line 14—14 of Figure 12, showing the spiral drive gear means for the front elevating mechanism. Figure 15 is an end view of the parking wheel carriage. Figure 16 is a plan view of the front elevating and reversible drive mechanism. Figure 17 is an end view of the same. Figure 18 is a detail view of the transmission latch pawl. Figure 19 is a cross sectional view taken through the clutch. And Figure 20 is a skeleton view of a vehicle chassis, showing the co-operation of the various elements of the device.

In the following specification the various features will be described separately as the front elevating mechanism, the rear elevating mechanism, the reversible drive mechanism, the shock absorber system, and finally a description of the coordination of all of the elements of the device.

Referring now to Figure 12 for a detail description of the front elevating mechanism, the numeral 1 designates a transverse support adapted to be attached to the vehicle frame in front of the motor. Adjacent each end of this support is a forwardly projecting bearing 2 and a forwardly projecting bearing 3, each having a central undercut recess 4.

Keyed to a transverse shaft 5 journaled in the bearings 2 and 3, and positioned in each of the recesses 4, 4, are spiral gears 6 and 7. Between the bearings 2 and 3 is another forwardly extending offset bearing 8 for a vertical drive shaft 9. Keyed to the latter in a recess 10 in the bearing 8 is another spiral gear 11 that meshes with a like gear 12 fixed upon the shaft 5 to rotate the latter.

Projecting vertically through the support 1, and in alinement with each of the recesses 4, 4, are shouldered recesses 13 that receive ball bearings 14, 14. (See Figure 13.) Received by the inner races of the bearings 14, 14 are shouldered spiral gears 15, 15 that mesh with the gears 6 and 7 respectively. Each of the gears 15 has a sleeve extension 16 that projects upwardly through the plate 1 where it is received by a collar 17.

Keyed to the sleeve extension 16 within the latter is a drive collar 18. Each drive collar is provided with internal threads and receives therein the upper ends of the threaded elevator screws 19, 19. Where these screws project above the collars 17, 17, they pass through brake collars 20, 20 that are slideably keyed to the screws 19, 19 respectively.

The collars 20, 20 are received by split brake shoes 21, 21, each secured by a stud 22 to the support 1. Above the shoes 21 the heads of the studs 22 are bifurcated to receive the ends of an apertured release plate 23, said ends being hingedly secured within the bifurcated portions of the studs. (See Figures 11 and 13.) Positioned within a transverse slot in the plate 23 is an inverted L shaped wedge finger 24 having a lower tapering end that is received by the tapering sides of the open ends of the shoes 21, 21. (See Figures 11 and 12.)

Projecting transversely through the bifurcated ends of the shoes 21, 21, and adjacent the finger 24, is a spring tensioned clamp bolt 25 that causes the brake shoes 21 to hold the brake collar against rotation when the wedge finger is withdrawn from between the split brake shoes. (See Figure 11.)

Above the plate 23 the elevator screws 19, 19 are of a reduced diameter and receive thereon flanged driving collars 26, 26, likewise slidably keyed to the screws 19, 19. Between the collars 26, 26 and retainer discs 27, 27 on top of the screws 19, 19, are helical compression springs 28, 28 that yieldably hold the collars 26, 26 against shoulders 19ª, 19ª formed by the reduced diameter of the screws.

Secured in each of the collars 26, 26, and depending therefrom, is a driving lug 29 adapted to enter either one of two diametrically opposite registering holes 30, 30 in the collars 20, 20 and like holes 31, 31 in the upper ends of the sleeve extensions 16, 16. (See Figures 11, 12 and 13.) Opposite the studs 22, 22, each of the release plates 23 has a lug extension 32 that is received between the bifurcated ends 33, 33 of lugs 34, 34 attached to the support 1 adjacent each of the screws 19, 19. (See Figures 11 and 13.)

Projecting transversely between the screws 19, 19, and journaled in the lugs 34, 34 below the plates 23, is a release shaft 35. Secured to the ends of the shaft, and positioned between the bifurcated ends of each of the lugs 34, 34, are release pawls 36, 36. Also attached to the shaft 35 adjacent one of the lugs 34 is a lever 37 by which, through means to be later described, the shaft may be rotated to bring the pawls 36, 36 into engagement with the plates 23, 23.

Now, when the shaft 9 is rotated in the direction indicated by the arrow in Figure 12, rotation will be imparted to the shaft 5 in the direction indicated, by the spiral gears 11 and 12. The shaft 5 in turn will rotate the spiral gears 15, 15 in the driving heads in the direction indicated by the arrow in Figure 13, through the spiral gears 6 and 7.

The wedge fingers 24, 24 will be out of engagement with the brake shoes 21, 21, and the latter will hold the brake collars 20, 20, and the screws 19, 19 to which they are keyed, against rotation. The internally threaded drive collars 18, 18, which are keyed within the sleeves 16 of the gears 15, 15, will rotate with the latter, thus forcing the screws 19, 19 downward. When these screws are lowered to substantially the positions shown in Figure 13, the driving lugs 29, 29 of each head will enter one of the slots 30, 30 in the brake collars 20, 20, and with the continued descent of the screws 19, 19 and collars 26, 26 will cause the lower ends of the lugs 29, 29 to enter one of the recesses 31 in the ends of the sleeves 16, 16. This establishes a positive driving connection between the gears 15, 15 and the screws 19, 19.

Before the lugs 29, 29 enter the recesses 31, 31, the flanges on the collars 26, 26 will engage the wedge fingers 24, 24 and force them downwardly between the split ends of the brake shoes 21, 21, thus releasing them from contact with the brake collars 20, 20 and permitting their rotation with the screws 19, 19. The compression springs 28, 28 permit a further descent of the screws 19, 19 after the collars 26, 26 contact the release plates 23, 23 and before the brake shoes are disengaged from the brake collar. (See Figures 11, 12 and 13.)

When it is desired to raise the screws 19, 19, the shaft 9 is rotated in a direction opposite to that shown in Figure 12, causing a resultant opposite direction of rotation of the gears 15, 15. The shaft 35 is now rotated by the lever 37 through means to be hereinafter described, causing the pawls 36, 36 to raise the release plates 23, 23. When these plates are elevated, the wedge fingers 24, 24 will be withdrawn from the split ends of the brake shoes 21, 21, allowing them, through the tension bolt 25, to firmly grip the brake collars 20, 20 and arrest any further turning movement of the screws 19, 19. The latter will then ascend through the rotation of the drive collars 18, 18 about them in a reverse direction to that indicated by the arrow in Figure 13.

Transverse motion is imparted to the vehicle when its wheels are elevated above the ground, by trucks or carriages 38, 38 attached to the lower ends of the screws 19, 19. Each one of these trucks, as shown in Figures 12 and 15, is equipped with four wide faced wheels 39 arranged in oppositely disposed pairs and mounted upon axles 40 and 41 with which they rotate. These axles are arranged in parallelism and pass through a housing 42 in which they are journaled.

Secured upon the axle 40, between the opposite bearing faces within the housing 42, is a worm gear 43. This gear meshes with a vertically positioned worm 44 whose axis is in alinement with its respective screw 19. The lower end of the worm 44 is provided with a bearing shoulder 45 that is journaled in the bottom of the housing 42, and at its upper end the worm has a shaft extension 44ª which is journaled in a cover plate 46 attached to the top of the housing 42. Where the upper end of the worm shaft 44ª projects above the cover plate 46, it terminates in a square head 47. Between the under side of this head and the cover plate 46, the worm shaft 44ª is within a thrust bearing 48 through which the weight of the vehicle is transferred to the housing.

The square head 47 of the worm shaft 44ª is received by a like square recess 49 formed within the bottom face of a shouldered foot disc 50. The latter has a lower spherical face 51 where it contacts the top face of the bearing 48, and a top shoulder 52 of reduced diameter that is received by a recess in the lower ends of the screws 19, 19 to which it is pinned. Between the head 47 and the disc 50 is a steel ball 52ª. Surrounding the bearing 48 and the foot disc 50 is a flanged cylindrical housing 53 secured to the top of the cover plate 46 and provided with a top aperture 54 through which the screw 19 passes.

Through the flexible connection of the foot disc 50 with the square head of the worm shaft 44ª and the contact of the spherical surface of the former with the bearing 48, the trucks or carriages are free to assume an angular position such as would be encountered near the curb of a highway when parking. The trucks 38, 38 at their adjacent faces are coupled by right and left hand threaded studs 55 and 56 whose adjacent ends are received by a coupling nut 57. (See Figure 12.) The outer ends of the studs have spherical ends 58, 58 that are received in spherical recesses formed between pairs of plates 59 and 60 attached to the ends of the housings 42, 42. This coupling holds the trucks 38, 38 in spaced relation and maintains the screws parallel.

When the screws 19, 19 are lowered, the wheels will first contact the road or street and elevate the vehicle. Now, when the driving lugs 29, 29 of the respective heads enter their respective slots 30, 30 and 31, 31, the descent of the car will cease and the screws 19, 19 will rotate. Through the worm and worm gear connection described above, motion will be imparted by the rotating screws to the wheels 39 to move the vehicle to the right or left, depending on the direction of rotation of the shaft 9, which is within the discretion of the driver.

Secured to one end of the shaft 5 beyond the bearing 3 is a bevel gear 61 that meshes with another bevel gear 62 keyed to the front end of a drive shaft 63. This shaft is journaled in a bearing extension 64 integral with the bearing 3 and projects rearwardly of the chassis of the vehicle to the rear elevating mechanism shown in Figures 9, 10 and 11.

Attached to the rear end of the shaft 63, which is journaled in a bearing 65, is another bevel gear 66. (See Figures 9 and 10.) Meshing with the bevel gear 66 is another bevel gear 67 that is keyed to a transverse shaft 68. The latter is journaled in bearings 69 and 70 integral with a cross support 71 which is attached to the car frame by brackets (not shown).

The bearings 69 and 70 have undercut recesses 72, 72 similar to the recesses 4, 4. Keyed to the shaft 68 within the recesses 72, 72 are spiral gears 73, 73, like the gears 6 and 7, that mesh with gears 74, 74 similar to the gears 15, 15. The gears 74, 74 operate brake and drive heads 75, 75 similar to the brake and drive heads for the elevator screws 19, 19, to operate elevator screws 76, 76 positioned in front of the spiral gears 73, 73. Attached to the lower ends of the elevator screws 76, 76 are trucks or carriages 76ª and 76ª like the trucks 38, 38 and operating in conjunction with the screws 76, 76 in the same manner as previously described.

The reversing mechanism as shown in Figures 12, 16, 17, 18 and 19 will now be described. Selective rotation is imparted to the shaft 9 through an integral gear 77 on the upper end of the former, and journaled in a housing 78 and its lower cover plate 79. (See Figure 12.)

Positioned on each side of the shaft 9, and parallel therewith, are right and left clutch shafts 80 and 81 respectively. Keyed to the lower ends of these clutch shafts, and contained within recesses in the lower cover plate 79, are right and left drive gears 82 and 83 which mesh with the gear 77. Also keyed to the upper ends of the shafts 80 and 81 are right and left clutch discs 84 and 85 that have reduced extensions 86, 86. (See Figure 12.) Rotatable about these hub extensions are worm gears 87 and 88, each one of which has an integral peripheral flange 89 that surrounds its respective disc of the discs 84 and 85. In the lower faces of the gears 87 and 88 are circular recesses that receive ball bearings 90, 90 which facilitate the free rotation of the gears about the clutch disc hubs when disengaged from the latter.

The gears 87 and 88 are simultaneously rotated right and left by a worm 91 with which they mesh. The latter is keyed to a shaft 92 journaled in the side walls of the housing 42 and projecting rearwardly to a power connection 93 with the vehicle motor that will presently be described.

Mounted on the D shaped shoulder on the lower face of each disc 84 and 85, is a moulded circular clutch lining 95 having a D shaped central aperture 96 in which the shoulders of the discs 84 and 85 are received, and whose outer face contacts the flanges 89. As shown in Figure 19, the clutch linings are split and form between their opposite faces a V shaped recess 97. These split linings are expanded into driving contact with the flanges 89 by a wedge-like point 98 formed on the ends of cam pins 99 and 100 which project laterally through a radial hole 101 in each shaft 80 and 81, and corresponding holes 102, 102 in the shoulders of the discs 84 and 85. Mounted on each of the cam pins between a collar integral with it and the clutch lining 95, is a compression spring 103 which forces the cam pins out of the recesses 97, thus breaking the driving connection between the clutch discs and the gears 87 and 88.

The inner ends of the cam pins are beveled at a 45° angle, and co-act with the lower beveled ends of vertical actuator pins 105 and 106. These pins are received by axial holes in the shafts 80 and 81, counterbored at their upper ends to receive between the bottom of said counterbores and an enlarged head portion on the pins, helical compression springs 107 and 108 which will force these actuator pins upwardly. The enlarged head portions of the pins are recessed to receive steel balls 109, 109 that project above the shafts 80 and 81, where they are engaged by oppositely disposed cam arms 110 and 111. These cam arms are pivoted at one end in recesses in a top cover plate 112 for the housing 78, their oppositely disposed inclined top surfaces 113 and 114 being engaged by adjustable cam rollers 115 and 116.

When either of the cam arms 110 or 111 is depressed, the corresponding actuator pin will also be depressed, and through the engagement of its beveled end with one of the cam pins 99 or 100, the latter will be forced outwardly into the V shaped recess 97 in the clutch lining to establish a driving connection between its respective clutch disc and the surrounding flange of one of the worm gears 87 or 88. (See Figures 12 and 19.)

The adjustable cam rollers 115 and 116 are mounted on studs 117 in transverse elongated slots 118 and 119 respectively in the top of an inverted channel shaped cover 120. The latter is slidably mounted on the cover plate 112 of the housing 78, and is movable to the right or left as desired by a worm screw 121 attached to one end thereof. The worm screw 121 is received by a worm screw thrust collar 122 whose outer ends are journaled in the side walls of a worm gear drive housing 123. The latter is attached by a bracket 124 to one end of the housing 78. Keyed to the collar 122, and positioned between thrust bearings 125 and 126 on each side thereof, is a worm gear 127 which meshes with a worm 128 positioned below it. (See Figures 11 and 12.) The worm 128 is integral with the armature shaft of a reversible motor 129 mounted on the rear face of the housing 123, and is journaled in bearings 130, 130 in the front and rear walls of the worm gear drive housing 123.

When the motor is operated, the cam rollers 115 and 116 will move either to the right or left, depending upon the direction of rotation of the motor 129, and will depress one of the cam arms 110 or 111 sufficiently to cause its respective clutch disc and lining to engage the flange 89 of one of the worm gears 87 or 88, whereupon the latter will rotate the clutch disc and its associated drive gear 82 or 83.

As shown in Figure 16, there is attached to the rear face of the channel member 120 a cam lobe 130 having oppositely disposed inclined faces. This cam lobe is adapted to engage, when shifted with the cover 120, a similar cam surface 131 formed on the outer free end of a lever 132 whose opposite end is pivoted to a bracket 134 secured to the face of the cover plate 112.

When the cam lobe 130 and the cover 120 are moved to the right as shown in Figure 16, the lever 132 will be forced rearwardly, where it will be engaged by an offset 135 on an arm 136 and held in a retracted position. The arm 136 is pivoted at its center in the upper bifurcated end of a support 137 attached to the cover plate 112. Attached to the support 137, below the rearwardly extending end of the arm 136, is a block 138 which receives in its top face a guide pin 139 and a compression spring 139ª surrounding the latter, to force the offset end 135 of the pivoted arm 136 downwardly to engage the lever 132. (See Figures 16 and 18.)

Contacting the rear face of the lever 132 near its central portion is a spring tension roller stud 140 mounted in the upper offset end of a yoked lever 141, whose lower end has a pivotal connection with a lug 142 on the rear of the housing 78. (See Figures 16 and 17.) Pivoted between the sides of the yoked lever 141 on pivot studs 143, 143, and slidably keyed to the worm shaft 92, is a clutch cone 144 of the power connection 93. This clutch cone is received in a conical recess 145 formed in a clutch sleeve 146 in alinement with it.

Formed in the rear end of the sleeve 146 is an axial bore 147 that receives the forward crankshaft extension 148 of the vehicle motor (not shown). When the lever 132 is released from the offset 135 of the arm 136, and is free to return to the position shown in Figure 16, the clutch cone 144 will be withdrawn from engagement with the sleeve 146 by the compression spring 149. This spring, which is mounted on a stud 150 in the rear face of the housing 78, is positioned between the head of the stud and a recess 151 formed in the rear face of the lever 141 above the cone 144.

Attached to the rear end of the arm 136 is a cable 152 that passes downward behind a pulley 153 rotatable in a yoke 154 secured to the rear face of the block 138. From this pulley the cable 152 projects rearwardly, where its opposite end is secured to the lower depending end of a bell crank 155 attached to the side of the vehicle transmission housing. (See Figures 18 and 20.)

The crank 155 is rotatable about a stud 156 secured to the side of the transmission housing, and on its opposite arm 157 has an offset 158. This offset is adapted to enter or engage a notch 159 formed in the periphery of a quadrant 160 attached to one end of the transmission gear shift lever shaft. (See Figure 20.) When the arm 132 is forced rearwardly, as previously described, the offset 135 of the arm 136 will engage the former and be forced downwardly by the spring 139$^a$. This causes the cable 152 to be drawn forwardly by the ascending rear end of the arm 136, whereupon the bell crank 155 will rotate about its pivot to bring the offset 158 of the crank into engagement with the notch 159 of the quadrant 160. This notch is only in alinement with the offset 158 when the gear shift lever is in neutral position. In the event it is not in a neutral position, the device as a whole is inoperative, since the offset 158 cannot enter the notch in the quadrant. Under such conditions the arm 136 will be maintained in a released position, as shown in Figure 18, by the tension of the cable 152. This will be true until the gear shift lever is again placed in a neutral position.

When the vehicle is removed from a parked position and its wheels lowered to a driving position in the lane of traffic, one of the front ascending screws 19 will, through its top disc 27, engage the lower end of a vertically sliding finger 162 mounted in a sleeve 163 secured to the housing 78. The finger will thus be forced upwardly, with its upper offset end 164 engaging the forward end of the arm 136 between its fulcrum and the lever 132 to disengage the offset end of the arm 136 from said lever, allowing it to move forwardly to the position shown in Figure 16. When in this position the power connection will be interrupted and the operation of the mechanism will cease. The offset 158 on the arm 157 will also be withdrawn from the quadrant to permit the shifting of the transmission gears in a normal manner to propel the vehicle either forward or backward.

The shock absorber and vehicle-spring lock mechanism will now be described. In order that the vehicle wheels will not drop an extreme distance due to a reverse flexure of the springs when the vehicle body is elevated by the parking device, the following means have been provided to lock them in substantially the positions they occupy when under the weight of the vehicle.

Referring to Figures 2 to 7 inclusive, the numeral 165 designates a vehicle chassis having conventional front and rear axles 166 and 167 respectively. Attached to each side of a frame structure 168, and positioned above each axle 166 and 167, is a shock absorber bracket 169 having a spherical recess in which the upper spherical end of a depending shock absorber piston rod 170 is mounted.

Secured to the lower end of the piston rod 170, within a cylinder 171, is a piston 172. Where the piston rod passes through the upper closed end of the cylinder, it is fitted with a conventional liquid tight packing nut 173. The lower open end of the cylinder is closed by a cap 174 that has an integral bracket 175. These brackets are attached to their respective axles 166 and 167 by U bolts 176 passing around the latter. (See Figure 4.)

The piston rod 170 has an axial passage 177 connecting with a lateral port 177$^a$ and communicating with the cylinder immediately above the piston 172. At its upper end the passage 177 communicates with another radial port in the spherical end of the piston rod, and on an axis parallel with the axle to which the shock absorber is attached. This radial port receives the threaded end of a pipe connection 178, and forms through a metal tube 179 a fluid connection with one side of a by-pass valve mechanism 180 positioned on the vehicle cowl. (See Figures 2, 3 and 4.)

Secured to the cap 174 is a radial connection 181 to which is attached a flexible metallic hose 182 provided with a fitting 183 secured to the vehicle frame 168 adjacent each bracket 169. These fittings 183 are connected through another metal tube 184 with the by-pass valve mechanism 180 on the side opposite to that side to which the tubes 179 are attached. (See Figures 4 and 5.)

Referring to the by-pass valve mechanism as illustrated in Figures 5, 6 and 7, the numeral 185 designates an oblong body having in axial alinement oppositely disposed threaded holes 186 and 187 which receive couplings 188 secured to the ends of the tubes 179 and 184. Communicating with the threaded holes 186 and 187 are transverse ports 189 that intercept at the center of the block and at right angles to said ports, a hole 190. Received in the latter is a slidable valve stem 191 having cut therein semi-circular grooves 192. When this stem is pushed inwardly, one of the grooves 192 will be in alinement with each of the ports 189. When the grooves and ports are thus alined, a fluid within the shock absorber cylinders on each side of its piston and in the tube connections 179 and 184 will freely oscillate through them and the valve mechanism to absorb the shocks or vibrations of the vehicle axles when passing over an uneven surface.

A radial pin 193 in the outer end of the stem 190 is engaged, on each side of a sleeve projection of the body 185, by an inclined slot 194. As the stem is rotated by a finger piece 195 that extends through the instrument panel of the vehicle, the former, through the engagement of the pin 193 with the slot 194, will gradually close the openings formed in the opposite walls of the hole 190 to regulate the shock absorber mechanism.

When it is desired to park a car equipped with my parking device and the above described shock absorber system, the finger piece is rotated to the right to force the valve stem inwardly until its full diameter completely closes the ports 189.

When the car is elevated, the springs are effectively locked so that there may be no downward movement of the axle, thus minimizing the distance that the vehicle must be raised to cause its wheels to clear the ground.

For the initial filling or refilling of the shock absorber system with fluid, the body 185 is provided with a passage 196 in parallelism with the hole 190, that has a tube connection 197 with the fluid supply source (not shown). Projecting downwardly from the top surface of the body, and intersecting the passage 196 and the ports 189, is a series of threaded holes 198 that receive valve screws 199 which, when screwed into the valve body beyond the passage 196, will effectively stop the flow of liquid from the latter to that particular port 189. (See Figures 5 and 7.) Also projecting downwardly from the top of the body 195, and on each side of the stem 190, are other threaded holes 200 and 201 that intersect each of the ports 189 on each side of the stem, so that when valve screws 202 and 203, which enter these holes, are screwed through the valve body into the ports 189, they will gradually close the latter.

If one of the shock absorbers is too free and does not affectively absorb the shocks, an adjustment of the screws 202 and 203 will alter the resistance to the passage of fluid through the valve mechanism to either accelerate or retard the movement of the piston 172 in that particular shock absorber. If it is desired to add fluid to one of the shock absorbers and tubing, each of which is wholly independent of the other, it may be added as desired by partially removing the screw 199 intersecting the port 189 connected with that shock absorber requiring the addition of liquid.

The co-ordinated action of the device is as follows. When it is desired to park a vehicle, it is stopped and the gear shift lever placed in neutral. It is assumed that the vehicle is on the right side of a thoroughfare and that it is the intention of the driver to move the vehicle to the right against the curb or in line with other vehicles. The reversing mechanism will be in a neutral position as shown in Figure 12 and 16.

Mounted on the vehicle cowl are to control buttons 204 and 205 that are hereinafter referred to as "right" and "left" buttons respectively. These buttons, when pressed, will, through conventional electric circuits, cause the motor 129 to rotate in either direction as long as a button is depressed, current for the operation of the motor being supplied by the vehicle battery (not shown). Thus, when the right button 204 is pressed, the cover plate 120 will be shifted to the right and when the left button 205 is pressed, the cover plate 120 will be shifted to the left. Through these buttons the cover plate 120 may also be shifted to a neutral position to disconnect the driving mechanism.

When the right button 204 is depressed, the motor 120, through the worm 121, will move the cover plate 120 and cam lobe 130 to the right, depressing the cam arm 111 and expanding the clutch lining 95 into driving engagement with the flange 89. The cam lobe 130, through its engagement with the cam lobe 131 on the arm 132, will be forced rearwardly until engaged by the arm 136, where it will be retained. The roller stud 140, through its engagement with the rear face of the arm 136, will force the clutch cone 144 into driving engagement with the clutch sleeve, and the vehicle motor, operating in a clockwise direction, will rotate the shaft in the direction indicated in Figure 12. The front screws 19 and the rear screws 76 will descend to elevate the car until the wedge finger 24 separates the brake shoes 31, checking the descent of the former and causing the elevator screws to rotate as previously described. The rotation of the elevator screws will cause the truck wheels 29 to rotate, carrying the vehicle side ways to a parked position.

When the desired lateral movement of the car has been accomplished, the left button 205 is pressed, whereupon the cover plate 120 is moved to the left until both of the cam arms 110 and 111 are in neutral position and the rotation of the shaft 9 ceases.

If it is desired to lower a car while parked, the continued left movement of the cover plate 120 will cause the cam arm 110 to be depressed and the shaft 9 to be rotated in a direction opposite that indicated by the arrow in Figure 12. In order to release the wedge fingers 24 from the brake shoes 21 and stop the rotation of the elevator screws, there is provided a push rod connection 206 projecting through the cowl to the front lever 37, and another rod 207 interconnecting the front and rear levers 37, by which said levers may be actuated to cause the pawls 36 to raise their respective release plates 23.

When the brake shoes are thus reset and the elevator screws stop rotating, they will ascend in their drive heads to lower the car. In their extreme upper positions, the disc 27 on the left screw 19 will engage the finger 162 as previously described, breaking the power connection 93 when the arm 132 moves forwardly to prevent damage to the mechanism.

The device is extremely flexible in operation, since the vehicle embodying it may be raised and moved either to the right or to the left. After the vehicle is shifted from its parked position into the line of traffic and lowered to the ground, it may be moved forward or backward as desired, with the parking device substantially concealed from view.

When the parking device is in operation, the gear shift of the vehicle is locked in a neutral position until the lowered car releases the lock mechanism as previously described.

Having described my invention, I claim:

1. The combination with a vehicle, of elevator screws for raising and lowering the latter, parking wheels carried by the lower ends of said screws for rotation thereby, driving means for lowering and elevating said screws, brake means for holding said screws against rotation during their descent and ascent, and means carried by the screws to release the brake means and to effect a rotative engagement between the driving means and the screws when the vehicle clears the ground, whereby said wheels may be rotated to shift the vehicle to the right or to the left.

2. The combination with a vehicle, of elevator screws for raising and lowering the latter, parking wheels carried by the lower ends of said screws for rotation thereby, driving means for lowering and elevating said screws, split brake shoes for holding the screws against rotation during their descent and ascent, and means for expanding the brake shoes when the vehicle clears the ground, to permit a rotation of the screws to turn said wheels, whereby the vehicle may be shifted to the right or to the left.

3. The combination with a vehicle, of elevator screws for raising and lowering said vehicle, parking wheels carried by the lower ends of said screws for rotation thereby, driving means for lowering and elevating the screws, split brake shoes for holding the screws against rotation during their descent and ascent, and wedge fingers for expanding the brake shoes when the vehicle clears the ground, to permit a rotation of the screws to turn said wheels, whereby the vehicle may be shifted to the right or to the left.

4. The combination with a vehicle, of elevator screws for raising and lowering the latter, parking wheels carried by the lower ends of said screws for rotation thereby, internally threaded driving collars on said screws, brake collars slidably keyed to the screws, split brake shoes applied to said brake collars, and means for expanding the brake shoes to permit the screws to be rotated by the driving collars when the vehicle clears the ground.

5. The combination with a vehicle, of elevator screws for raising and lowering the latter, parking wheels carried by the lower ends of said screws for rotation thereby, drive gears surrounding said screws, sleeve extensions on said gears, drive collars connected to said sleeve extensions for threaded engagement with said screws, brake collars slidably keyed to the screws, split brake shoes applied to the brake collars, said sleeve extensions formed with recesses, driving lugs adapted to engage the sleeve extensions of said gears when the vehicle clears the ground, and means for expanding the brake shoes to permit the screws to be rotated by the driving connection which said lugs establish between the driving collars and the gears.

6. The combination with a vehicle of elevator screws for raising and lowering the latter, parking wheels carried by the lower ends of said screws for rotation thereby, driving means for lowering and elevating the screws, means for effecting a rotative engagement between the driving means and the screws when the vehicle clears the ground, and electrical means for determining the direction of rotation of the parking wheels.

7. The combination with a vehicle, of elevator screws for raising and lowering the latter, parking wheels carried by the lower ends of said screws for rotation thereby, driving means for lowering and elevating the screws, means for effecting a rotative engagement between the driving means and the screws when the vehicle clears the ground, reversing mechanism for said driving means, and electrical means for controlling the reversing mechanism.

8. The combination with a vehicle, of elevator screws for raising and lowering the latter, parking wheels carried by the lower ends of said screws for rotation thereby, driving means for lowering and elevating the screws, means for effecting a rotative engagement between the driving means and the screws when the vehicle clears the ground, electrical means for stopping the rotation of said screws when the vehicle is in a parked position, and means for restarting the driving means to lower the vehicle to the ground.

9. The combination with a vehicle, of elevator screws for raising and lowering the latter, parking wheels carried by the lower ends of said screws, driving means for lowering and elevating the screws, means for effecting a rotative engagement between the driving means and the screws when the vehicle clears the ground, a vehicle driving motor for operating said driving means, electrical means for breaking the connection between said motor and the driving means when the vehicle is in a parked position, and means for restarting the driving means to lower the vehicle to the ground.

10. The combination with a vehicle, of elevator screws for raising and lowering the vehile, parking wheels carried by the lower ends of the screws, driving means for lowering and elevating the screws, a vehicle driving motor for operating the driving means, a clutch between the motor and the driving means, and a lever adapted to be actuated by the upper end of a screw to disengage the clutch when the screws reach a predetermined upper position.

11. The combination with a motor vehicle including a transmission mechanism and a gear shift lever for controlling the latter, of elevator screws for raising and lowering said vehicle, driving means for said screws, and means connected between the gear shift lever and the driving means for rendering the latter inoperative until the gear shift lever is in a neutral position.

12. The combination with a motor vehicle including a transmission mechanism and a gear shift lever for controlling the latter, of elevator screws for raising and lowering said vehicle, driving means for said screws, a quadrant on said gear shift lever formed with a notch, and means engaging the periphery of the quadrant to render the driving means inoperative until said means enter the notch, at which time the gear shift lever is in a neutral position.

13. The combination with a motor vehicle including a transmission mechanism and a gear shift lever for controlling the latter, of elevator screws for raising and lowering the vehicle, driving means for said screws, means for locking the gear shift lever in a neutral position during the actuation of the elevator screws by the driving means, a vehicle driving motor for operating the driving means, means for breaking the connection between the motor and the driving means, and a device controlled by the motor connection-breaking means to unlock the gear shift lever when the connection between the motor and the driving means is broken.

14. The combination with a vehicle, of elevating screws for raising and lowering the latter, parking wheels carried by the lower ends of said screws for rotation thereby, driving gears for lowering and elevating the screws, means for effecting a rotative engagement between the driving gears and the screws when the vehicle clears the ground, a power shaft, and reversing clutch mechanism between the power shaft and the driving gears.

15. The combination with a vehicle, of elevating screws for raising and lowering the latter, parking wheels carried by the lower ends of said screws for rotation thereby, driving gears for lowering and elevating the screws, means for effecting a rotative engagement between the driving gears and the screws when the vehicle clears the ground, a shaft for rotating the driving gears, a second shaft on one side of the first shaft and a third shaft on the other side of the first shaft, a gear connection between the first shaft and the second and third shafts, a power shaft, a gear connection between the power shaft and the second and third shafts, whereby the second shaft and the third shaft are driven in reverse directions by the power shaft, and clutch means for establishing a driving connection between the power shaft and either the first or the second shafts to rotate the first shaft, and through it, the elevating screws in a selected direction.

16. The combination with a vehicle, of elevating screws for raising and lowering the latter, parking wheels carried by the lower ends of the screws for rotation thereby, driving gears for lowering and elevating the screws, means for effecting a rotative engagement between the driving gears and the screws when the vehicle clears the ground, a power shaft, a reversing clutch mechanism between the power shaft and the driving gears, and a shiftable device for operating the reversing clutch mechanism.

17. The combination with a vehicle, of elevating screws for raising and lowering the latter, parking wheels carried by the lower ends of the screws for rotation thereby, driving gears for lowering and elevating the screws, means for effecting a rotative engagement between the driving gears and the screws when the vehicle clears the ground, a power shaft, a reversing clutch mechanism between the power shaft and the driving gears, a shiftable device for actuating the reversing clutch mechanism, an electric motor for shifting said device, and an electric button control for the motor.

18. The combination with a vehicle, of elevating screws for raising and lowering the latter, parking wheels carried by the lower ends of the screws for rotation thereby, driving gears for lowering and elevating the screws, means for effecting a rotative engagement between the driving gears and the screws when the vehicle clears the ground, a reversing mechanism for the driving gears, a shiftable device for actuating the reversing mechanism, a power shaft, a clutch between the reversing mechanism and the power shaft, and a lever engageable by the shiftable device to force the clutch in engagement with the power shaft whereby the latter may operate the driving gears in a selected direction through the reversing mechanism.

19. The combination with a vehicle, of elevating screws for raising and lowering the latter, parking wheels carried by the lower ends of the screws for rotation thereby, driving gears for lowering and elevating the screws, means for effecting a rotative engagement between the driving gears and the screws when the vehicle clears the ground, a reversing mechanism for the driving gears, a shiftable device for controlling the reversing mechanism, a power shaft, a clutch between the reversing mechanism and the power shaft, a lever adapted to be engaged by the shiftable device to force the clutch in engagement with the power shaft whereby the latter may operate the driving gears in a desired direction through the reversing mechanism, and releasable means adapted to engage the lever to hold the shiftable device in a retracted position and the clutch in engagement with the power shaft.

20. The combination with a vehicle, of elevating screws for raising and lowering the latter, driving means for lowering and elevating the screws, means for effecting a rotative engagement between the driving gears and the screws when the vehicle clears the ground, parking wheels flexibly secured to the lower ends of the screws, and a flexible driving connection between the screws and the parking wheels whereby the latter may be rotated by the screws when in an angular position on the ground.

In testimony whereof I have hereunto set my hand this 17th day of June, 1932.

ALFRED R. McCANN.